(12) United States Patent
Terrádez Alemany et al.

(10) Patent No.: US 12,390,076 B2
(45) Date of Patent: Aug. 19, 2025

(54) SYSTEM COMPRISING A DISHWASHER, AND METHOD FOR OPERATING A DISHWASHER

(71) Applicant: BSH Hausgeräte GmbH, Munich (DE)

(72) Inventors: Maria Terrádez Alemany, Munich (DE); Berkay Ogulcan Tutal, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 411 days.

(21) Appl. No.: 17/797,732

(22) PCT Filed: Feb. 10, 2021

(86) PCT No.: PCT/EP2021/053141
§ 371 (c)(1),
(2) Date: Aug. 5, 2022

(87) PCT Pub. No.: WO2021/170404
PCT Pub. Date: Sep. 2, 2021

(65) Prior Publication Data
US 2023/0148826 A1    May 18, 2023

(30) Foreign Application Priority Data
Feb. 27, 2020   (DE) .................... 102020202502.9

(51) Int. Cl.
*A47L 15/00*    (2006.01)
*A47L 15/42*    (2006.01)
(Continued)

(52) U.S. Cl.
CPC ....... *A47L 15/0021* (2013.01); *A47L 15/4293* (2013.01); *A47L 15/4295* (2013.01);
(Continued)

(58) Field of Classification Search
None
See application file for complete search history.

(56) References Cited

U.S. PATENT DOCUMENTS

2010/0294311 A1   11/2010  Classen
2012/0060875 A1   3/2012   Fauth
(Continued)

FOREIGN PATENT DOCUMENTS

DE        10048081 A1    4/2002
DE     102011087227 A1   5/2013
(Continued)

OTHER PUBLICATIONS

DE 102017118023 A1 translation, Method For Operating A Dishwasher And Dishwasher, Hackert (Year: 2019).*
(Continued)

*Primary Examiner* — Cristi J Tate-Sims
(74) *Attorney, Agent, or Firm* — Michael E. Tschupp; Andre Pallapies; Brandon G. Braun (57) ABSTRACT

A system includes a dishwasher having a dishwasher cavity which can be closed by a door. Receptacles are provided for accommodating items to be washed, and a control device carries out a washing program from a number of washing programs for washing items to be washed. An optical sensor records an optical sensor signal of the dishwasher cavity, and a determining unit determines a load state of the dishwasher cavity as a function of the optical sensor signal recorded by the optical sensor. An output unit outputs a positioning recommendation to a user for the purpose of positioning at least one of the items to be washed in one of the receptacles based on the load state determined by the determining unit.

18 Claims, 3 Drawing Sheets

(51) Int. Cl.
   *A47L 15/46*     (2006.01)
   *G06V 20/50*     (2022.01)
(52) U.S. Cl.
   CPC ........... *A47L 15/46* (2013.01); *A47L 2401/04* (2013.01); *A47L 2501/26* (2013.01); *G06V 20/50* (2022.01)

(56) References Cited

U.S. PATENT DOCUMENTS

2018/0214001 A1*  8/2018  Wöbkemeier ....... A47L 15/4295
2021/0127943 A1*  5/2021  Ha ....................... A47L 15/427

FOREIGN PATENT DOCUMENTS

DE     102017118023 A1    2/2019
DE     102019108395 A1    10/2019
WO       2014090732 A1    6/2014

OTHER PUBLICATIONS

International Search Report PCT/EP/2021/053141 dated Mar. 9, 2021.

* cited by examiner

SYSTEM COMPRISING A DISHWASHER, AND METHOD FOR OPERATING A DISHWASHER

CROSS-REFERENCES TO RELATED APPLICATIONS

This application is the U.S. National Stage of International Application No. PCT/EP2021/053141, filed Feb. 10, 2021, which designated the United States and has been published as International Publication No. WO 2021/170404 A1 and which claims the priority of German Patent Application, Serial No. 10 2020 202 502.9, filed Feb. 27, 2020, pursuant to 35 U.S.C. 119 (a)-(d).

The contents of International Application No. PCT/EP2021/053141 and German Patent Application, Serial No. 10 2020 202 502.9 are incorporated herein by reference in their entireties as if fully set forth herein.

BACKGROUND OF THE INVENTION

The present invention relates to a system with a dishwasher, such as a household dishwasher for example, as well as to a method for operating a dishwasher.

A household dishwasher sometimes comprises a dishwasher cavity, which can be closed off by a door, with a number of receptacles for items to be washed for accommodating items to be washed, and a control device for carrying out one washing program from a number of washing programs for washing items to be washed.

The user only receives assistance with loading the receptacles for items to be washed of the dishwasher cavity from the printed operating guide for the dishwasher, from the printed manual for the dishwasher, or from training videos on the Internet. However, this is all very laborious for the user and generally is not used either.

For this reason, it is assumed that the dishwasher cavity is frequently not loaded with items to be washed by the user in an optimal manner. Due to the sub-optimal loading of the dishwasher cavity, a sub-optimal cleaning result, a sub-optimal drying result and/or an increased energy consumption may occur.

Conventional solutions are known from US 2018/0214001 A1, DE 10 2011 087 227 A1, DE 10 048 081 A1, DE 10 2012 223 243 A1 and US 2012/0060875 A1.

BRIEF SUMMARY OF THE INVENTION

Against this background, an object of the present invention consists in further improving the operation of a dishwasher.

According to a first aspect, a system is proposed with a dishwasher, in particular household dishwasher, having a dishwasher cavity, which can be closed off by a door, with a number of receptacles for items to be washed for accommodating items to be washed, and a control device for carrying out one washing program from a number of washing programs for washing items to be washed, with an optical sensor for recording an optical sensor signal of the dishwasher cavity, with a determining unit for determining a load state of the dishwasher cavity as a function of the recorded optical sensor signal, and with an output unit for outputting a positioning recommendation to a user for the purpose of positioning at least one item to be washed in one of the receptacles for items to be washed on the basis of the determined load state.

In this context, the determined load state indicates, in particular for each of the receptacles for items to be washed, the places at which the respective receptacle for items to be washed is loaded. The determined load state preferably indicates, in particular for each of the receptacles for items to be washed, the places at which the respective receptacle for items to be washed is loaded, and in this context with which items to be washed it is loaded. According to inverted logic, this may also be expressed as follows: the determined load state indicates existing free spaces in the respective receptacle for items to be washed. A new item to be washed can be arranged in such a free space, or an item to be washed that has been incorrectly positioned in one of the receptacles for items to be washed can be placed in such a free space.

The output unit comprises in particular a visual and/or aural output. For example, the output unit comprises a screen and/or a loudspeaker. In this context, the output unit may be configured to use an augmented reality representation or a virtual reality representation to output the positioning recommendation to the user.

The operation of the dishwasher is improved by the positioning recommendation generated automatically for the user. The positioning recommendation generated automatically and output to the user in this context helps the user to load the dishwasher optimally, and to do so as a function of the respective load state of the dishwasher that has currently been determined. Optimal loading of the dishwasher produces an optimized cleaning result, an optimized drying result and an optimization of the energy consumption.

Furthermore, it is possible to derive user-specific data from a number of washing cycles, wherein from the user-specific data, in turn, user-specific advice and recommendations for the operation of the dishwasher can be generated and output to the user via the output unit. Furthermore, from this obtained data, in particular the determined load states and the derived user data, it is possible to establish an internal database for the dishwasher as well as an external database, in particular for the dishwasher manufacturer. In particular, by way of the external database, for example managed by the dishwasher manufacturer, it is also possible to output positioning recommendations to other users, for example in the same cultural area. This also means that users are also able to benefit from positioning recommendations that are generated or optimized from data from other users.

The control device may be implemented as hardware and/or also as software. The control device is in particular integrated into the dishwasher. Alternatively, the control device can also be arranged outside the dishwasher. If implemented as hardware, the control device can be embodied for example as a computer or microprocessor. If implemented as software, the control device can be embodied as a computer program product, as a function, as a routine, as part of a program code or as an executable object.

The control device is configured to carry out one washing program from a number of washing programs for washing the items to be washed. A washing program comprises for example different program sub-steps, such as a pre-rinse, a cleaning, a rinsing and/or a drying. Different washing programs differ for example with regard to a sequence and/or type of program sub-steps and with regard to different operating parameters, such as for example a duration and/or washing liquor temperature of one or several program sub-steps.

Items to be washed are arranged in the washing compartment, in particular on one or several receptacles for items to be washed, for washing with the household dishwasher. The items to be washed comprise in particular various items of dishware, cutlery and/or tools which are used for preparing, storing and/or consuming foods. These are for example plates, pots, cups, knives, glasses, bowls and the like.

According to one embodiment, the output unit is configured to output the positioning recommendation to the user for the purpose of positioning at least one item to be washed in one of the receptacles for items to be washed on the basis of the determined load state and a target loading of the dishwasher.

The target loading of the dishwasher may be part of the operating guide or the manual of the dishwasher. In the event that the dishwasher has a communication unit, the target loading may also be loaded via the Internet, for example from a cloud of the dishwasher manufacturer.

According to a further embodiment, the optical sensor is further configured for recording an optical sensor signal of an item to be washed, wherein the output unit is configured to take into consideration a geometry, a volume and/or a shape of the item to be washed for the positioning recommendation to the user.

In this context, the positioning recommendation can be optimized in that, as a function of the geometry, the volume and/or the shape of the item to be washed, an optimal free space is found in one of the receptacles for items to be washed and is visually and/or aurally output to the user via the positioning recommendation.

According to a further embodiment, the determining unit is configured, when determining the load state of the dishwasher cavity, to detect an incorrect positioning of a particular item to be washed that is arranged in one of the receptacles for items to be washed, wherein the output unit is configured to output a positioning recommendation to the user to re-sort the particular item to be washed on the basis of the detected incorrect positioning.

According to a further embodiment, the determining unit is configured, when determining the load state of the dishwasher cavity, to detect an incorrect orientation of a particular item to be washed that is arranged in one of the receptacles for items to be washed, wherein the output unit is configured to output a positioning recommendation to the user to rotate, in particular to turn over, the particular item to be washed on the basis of the detected incorrect orientation.

Thus, it is also possible to correct an incorrect orientation of an item to be washed that is arranged in one of the receptacles for items to be washed. If, for example, the item to be washed is a glass and the user puts it in one of the receptacles for items to be washed such that the opening is facing upward, then, when the washing program is running, the glass will fill up with washing liquor and this will therefore interfere with or even prevent subsequent drying. In order to prevent this, the determining unit is preferably configured, when determining the load state of the dishwasher cavity, to detect such an incorrect orientation of an item to be washed that is arranged in one of the receptacles for items to be washed, wherein the output unit is then configured to output a positioning recommendation to rotate, in particular to turn over, the item to be washed on the basis of the detected incorrect orientation. In particular, an incorrect orientation is not only present at an angle of 180°. As the wires of the receptacles for items to be washed may have different angles, an incorrect orientation may already be present at considerably lower degree values. Thus, for example, if the cup is at too low an oblique position in the cup shelf, then washing liquor may accumulate in an amount that means that complete drying is no longer possible. In such a case, the positioning recommendation can recommend to the user, for example, to slightly rotate the item to be washed or re-sort it to another place in the dishwasher cavity, in particular a place with a greater incline of the contact surface.

According to a further embodiment, the optical sensor is further configured to record an optical sensor signal of a further item to be washed that is to be newly introduced into the dishwasher cavity, wherein the output unit is configured to output a positioning recommendation to the user for the purpose of sorting the further item to be washed into one of the receptacles for items to be washed of the dishwasher cavity on the basis of the recorded optical sensor signal of the further item to be washed as well as on the basis of the determined load state.

This means that the present positioning recommendation is advantageously based not only on the currently determined load state of the receptacles for items to be washed, but also on the item to be washed that is currently to be put in place. This means that the present positioning recommendation is also optimized with regard to the item to be washed that is to be put in place.

According to a further embodiment, the output unit is configured to use an augmented reality representation or a virtual reality representation to output the positioning recommendation to the user.

For example, if the output unit is embodied on a smartphone of the user or a tablet of the user, a virtual reality representation is particularly suitable for guiding the user optimally in loading the dishwasher. If, for example, the output unit is integrated on AR glasses, the augmented reality representation is particularly advantageous for supporting the user in loading the dishwasher.

According to a further embodiment, the optical sensor comprises a camera, wherein the optical sensor signal comprises an image and/or a video of the dishwasher cavity.

According to a further embodiment, the dishwasher integrates the optical sensor, the determining unit and the output unit.

According to a further embodiment, the system has a facility that is external to the dishwasher and integrates at least the optical sensor.

According to a further embodiment, the external facility integrates the optical sensor and the determining unit.

According to a further embodiment, the external facility integrates the optical sensor and the output unit.

According to a further embodiment, the external facility integrates the optical sensor, the determining unit and the output unit.

According to a further embodiment, the determining unit and the output unit are embodied as part of an app that can be installed on the external facility.

The external facility is in particular a mobile device. The mobile device is for example a smartphone, a tablet or a tablet computer. The app can also be referred to as application, application software or application program. The app can be embodied in particular as a program, as a computer program, as software, as a computer program product, as a function, as a routine, as part of a program code or as an executable object.

In particular, the dishwasher comprises a communication unit, which can be connected for example by means of a network to the external facility and thus to the app installed on the external facility. Here, the network comprises in particular a mobile radio network, a WLAN and/or a further wireless or wired data network.

According to a second aspect, a system is proposed for a dishwasher, in particular a household dishwasher, with a dishwasher cavity, which can be closed off by a door, with a number of receptacles for items to be washed for accommodating items to be washed, and with a control device for carrying out one washing program from a number of washing programs for washing items to be washed. In this context, the system comprises an optical sensor for recording an optical sensor signal of the dishwasher cavity, a determining unit for determining a load state of the dishwasher cavity as a function of the recorded optical sensor signal and an output unit for outputting a positioning recommendation to a user for the purpose of positioning at least one item to be washed in one of the receptacles for items to be washed on the basis of the determined load state.

According to a third aspect, a method is proposed for operating a dishwasher, in particular a household dishwasher, with a dishwasher cavity, which can be closed off by a door, with a number of receptacles for items to be washed for accommodating items to be washed, and with a control device for carrying out one washing program from a number of washing programs for washing proposed items to be washed. The method comprises the following steps:

recording an optical sensor signal of the dishwasher cavity by means of an optical sensor, determining a load state of the dishwasher cavity as a function of the recorded optical sensor signal, and outputting a positioning recommendation to a user for the purpose of positioning at least one item to be washed in one of the receptacles for items to be washed on the basis of the determined load state.

The embodiments and features described for the proposed system apply correspondingly to the proposed method.

According to a fourth aspect, a computer program product is proposed which prompts the method as described above to be carried out on a program-controlled facility.

A computer program product, such as a computer program means for example, can for example be provided or supplied as a storage medium such as a memory card, USB stick, CD-ROM or DVD for example, or also in the form of a file which can be downloaded from a server in a network. This can take place, for example, in a wireless communications network through the transmission of a corresponding file with the computer program product or the computer program means.

Further possible implementations of the invention also comprise combinations—not explicitly cited—of features or embodiments described above or below in respect of the exemplary embodiments. In this context, the person skilled in the art will also add individual aspects as improvements or enhancements to the respective basic form of the invention.

BRIEF DESCRIPTION OF THE DRAWINGS

Further advantageous embodiments and aspects of the invention form the subject matter of the subclaims and of the exemplary embodiments of the invention that are described below. The invention is described below in greater detail on the basis of preferred embodiments with reference to the attached figures.

DETAILED DESCRIPTION OF EXEMPLARY EMBODIMENTS OF THE PRESENT INVENTION

In the figures, elements that are identical or have the same function are provided with the same reference characters unless specified otherwise.

Figure 1:
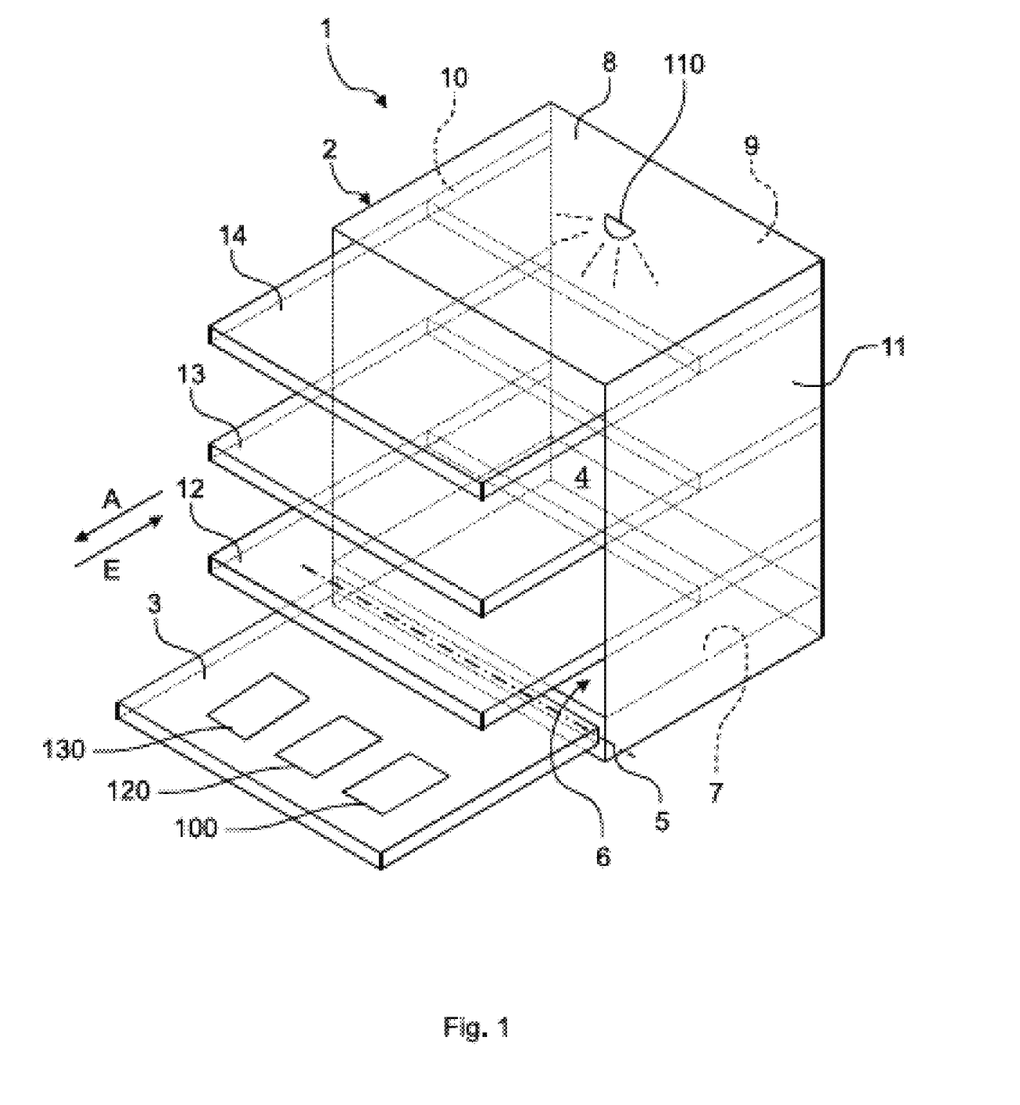
FIG. 1 shows a schematic perspective view of an exemplary embodiment of a system with a household dishwasher.

FIG. 1 shows a schematic perspective view of an exemplary embodiment of a system with a household dishwasher 1. The household dishwasher 1 comprises a dishwasher cavity 2, which can be closed off by a door 3, in particular in a watertight manner. A sealing facility can be provided for this purpose between the door 3 and the dishwasher cavity 2 (not shown). The dishwasher cavity 2 is preferably cuboid in shape. The dishwasher cavity 2 can be arranged in a housing of the household dishwasher 1. The dishwasher cavity 2 and the door 3 can form a washing compartment 4 for washing items to be washed.

The door 3 is shown in its opened position in FIG. 1. The door 3 can be closed or opened by pivoting about a pivot axis 5 provided at a lower end of the door 3. With the aid of the door 3, a loading opening 6 of the dishwasher cavity 2 can be closed or opened. The dishwasher cavity 2 has a base 7, a ceiling 8 arranged opposite the base 7, a rear wall 9 arranged opposite the closed door 3 and two side walls 10, 11 arranged opposite one another. The base 7, the ceiling 8, the rear wall 9 and the side walls 10, 11 can be manufactured from a stainless-steel sheet, for example. Alternatively, the base 7 can be manufactured from a plastic material, for example.

Furthermore, the household dishwasher 1 has at least one receptacle for items to be washed 12, 13, 14. Preferably, a plurality of receptacles for items to be washed 12, 13, 14, for example three, can be provided, wherein the receptacle for items to be washed 12 can be a lower receptacle for items to be washed or a lower basket, the receptacle for items to be washed 13 can be an upper receptacle for items to be washed or an upper basket, and the receptacle for items to be washed 14 can be a cutlery drawer. As additionally shown in FIG. 1, the receptacles for items to be washed 12, 13, 14 are arranged one above the other in the dishwasher cavity 2. Each receptacle for items to be washed 12, 13, 14 is optionally able to be shifted into or out of the dishwasher cavity 2. In particular, each receptacle for items to be washed 12, 13, 14 is able to be inserted into the dishwasher cavity 2 in an insertion direction E and extracted from the dishwasher cavity 2 in an extraction direction A opposite to the insertion direction E.

An optical sensor 110 embodied as a camera is arranged on the ceiling 8, such that it is configured to record an optical sensor signal of the dishwasher cavity 2 and in particular the items to be washed arranged in the washing compartment 4. The dashed lines below the optical sensor 110 indicate a recording region of the optical sensor 110. It should be noted that the recording region is not limited to the washing compartment 4.

The optical sensor 110 may also be arranged at another place on the dishwasher 1, for example on an outer shell of the dishwasher 1. In this context, the optical sensor 110 is arranged in particular in such a manner that it is able to take an image of the items to be washed arranged in the receptacles for items to be washed 12, 13, 14, in particular in the extracted state of the respective receptacle for items to be washed.

The household dishwasher 1 also has a control device, a determining unit 120 and an output unit 130, which are arranged on the door 3.

The control device 100 is configured to carry out one washing program from a number of washing programs for washing items to be washed in the dishwasher cavity 2.

The determining unit 120 is configured to determine a load state of the dishwasher cavity 2 as a function of the recorded optical sensor signal. In this context, the determined load state indicates, in particular for each of the receptacles for items to be washed 12, 13 and 14, the places at which the respective receptacle for items to be washed 12, 13, 14 is loaded. The determined load state preferably indicates, in particular for each of the receptacles for items to be washed 12, 13 and 14, the places at which the respective receptacle for items to be washed 12, 13, 14 is loaded, and in this context with which items to be washed it is loaded.

The determined load state thereby indicates existing free spaces in the respective receptacle for items to be washed 12, 13, 14. A new item to be washed can be arranged in such a free space, or an item to be washed that has been incorrectly positioned in one of the receptacles for items to be washed 12, 13, 14 can be placed in such a free space.

The output unit 130 is configured to output a positioning recommendation to the user of the dishwasher 1 for the purpose of positioning at least one item to be washed in one of the receptacles for items to be washed 12, 13, 14 on the basis of the determined load state. The output unit 130 comprises in particular a visual and/or aural output. For example, the output unit 130 comprises a screen and/or a loudspeaker. The output unit 130 may also be configured to use an augmented reality representation or a virtual reality representation to output the positioning recommendation to the user.

In particular, the output unit 130 is also configured, in addition to the determined load state, to also use a target loading of the dishwasher 1 when generating the positioning recommendation for the user for the purpose of positioning the at least one item to be washed. For example, the output unit 130 can load the target loading from a memory of the dishwasher 1. The target loading of the dishwasher 1 may also be part of the operating guide or the manual of the dishwasher 1. In the event that the dishwasher 1 has a communication unit (not shown), the target loading may also be loaded via the Internet, for example from a cloud of the dishwasher manufacturer.

Furthermore, the optical sensor 110 may also be configured to record an optical sensor signal of an item to be washed. In such a case, the output unit 130 may be configured to take into consideration a geometry, a volume and/or a shape of the item to be washed for the positioning recommendation to the user. Accordingly, the positioning recommendation can be optimized in that, as a function of the geometry, the volume and/or the shape of the item to be washed, an optimal free space is found in one of the receptacles for items to be washed 12, 13, 14 and is also indicated to the user via the positioning recommendation.

For example, the determining unit 120 is configured, when determining the load state of the dishwasher cavity 2, to detect an incorrect positioning of a particular item to be washed that is arranged in one of the receptacles for items to be washed 12, 13, 14. If the determining unit 120 detects such an incorrect positioning, the output unit 130 is able to output a positioning recommendation to the user to re-sort the particular item to be washed on the basis of the detected incorrect positioning. To summarize, the determining unit 120 determines the incorrect positioning of a particular item to be washed and the output unit 130 outputs a corresponding positioning recommendation to the user to re-sort the particular item to be washed.

An incorrect orientation of a particular item to be washed that is arranged in one of the receptacles for items to be washed 12, 13, 14 is also possible. If, for example, the item to be washed is a cup and the user puts it in one of the receptacles for items to be washed 12, 13, 14 such that the opening is facing upward, then, when the washing program is running, the cup will fill up with washing liquor and thus interfere with or even prevent subsequent drying as the subsequent step of the washing program. In order to prevent this, the determining unit 120 is in particular configured, when determining the load state of the dishwasher cavity 2, to detect such an incorrect orientation of an item to be washed that is arranged in one of the receptacles for items to be washed 12, 13, 14, wherein the output unit 130 is then configured to output a positioning recommendation to rotate, in particular to turn over, the item to be washed on the basis of the detected incorrect orientation. In particular, an incorrect orientation is not only present at an angle of 180°. As the wires of the receptacles for items to be washed 12, 13, 14 may have different angles, an incorrect orientation may already be present at considerably lower degree values. Thus, for example, if the cup is at too low an oblique position in the cup shelf, then washing liquor may accumulate, which prevents a complete drying. In such a case, the positioning recommendation can recommend to the user, for example, to slightly rotate the item to be washed or re-sort it to another place in the dishwasher cavity, in particular a place with a greater incline of the contact surface.

Furthermore, the optical sensor 110 is also configured to record an optical sensor signal of a further item to be washed that is to be newly introduced into the dishwasher cavity 2. The output unit 130 may then be configured to output a positioning recommendation to the user for the purpose of sorting the further item to be washed into one of the receptacles for items to be washed 12, 13, 14 of the dishwasher cavity 2 on the basis of the recorded optical sensor signal of the further item to be washed as well as on the basis of the determined load state. Thus, this positioning recommendation is dependent upon the item to be washed that is currently to be put in place and the currently determined load state of the receptacles for items to be washed 12, 13, 14.

Figure 2:
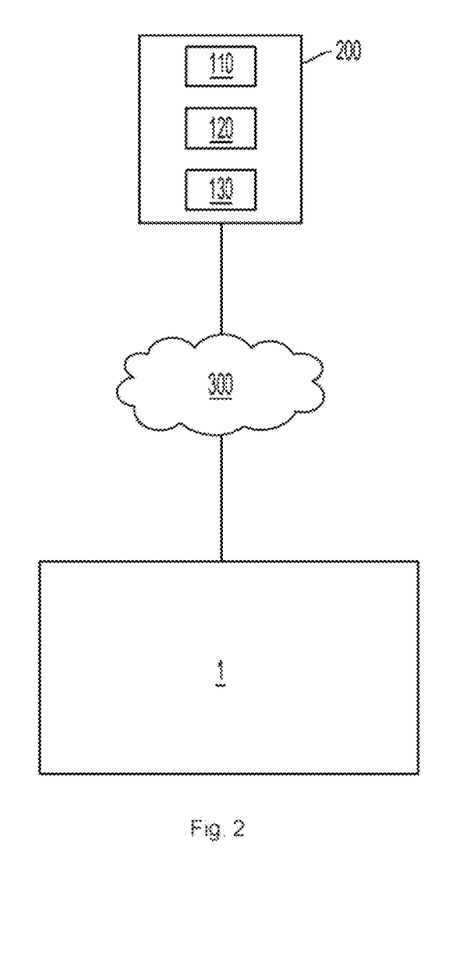
FIG. 2 shows a schematic view of a further exemplary embodiment of a system with a household dishwasher and an external facility.

FIG. 2 shows a schematic view of a further exemplary embodiment of a system with a dishwasher 1 and an external facility 200. The dishwasher 1 and the external facility 200 may be linked via at least one network 300, for example the Internet. The exemplary embodiment in FIG. 2 differs from the exemplary embodiment according to FIG. 1 in that the optical sensor 110, the determining unit 120 and the output unit 130 are integrated in the external facility 200. The external facility 200 is for example a smartphone or a tablet. The optical sensor 110 is for example the camera of the smartphone or tablet. The determining unit 120 and the output unit 130 are integrated at least partly in an app that is installed and run on the external facility 200, for example.

Figure 3:
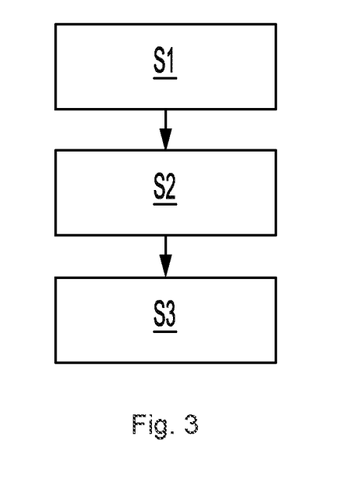
FIG. 3 shows a schematic block diagram of an exemplary embodiment of a method for operating a household dishwasher.

FIG. 3 shows a schematic block diagram of a method for operating a dishwasher 1 with a dishwasher cavity 2, which can be closed off by a door 3, with a number of receptacles for items to be washed 12, 13, 14 for accommodating items to be washed, and with a control device 100 for carrying out one washing program from a number of washing programs for washing items to be washed. An example of a household dishwasher 1 is shown in FIG. 1. The method in FIG. 3 comprises the steps S1 to S3.

In step S1, an optical sensor signal of the dishwasher cavity 2 is recorded by means of an optical sensor 110.

In step S2, a load state of the dishwasher cavity 2 is determined as a function of the recorded optical sensor signal.

In step S3, a positioning recommendation is output to a user of the dishwasher 1 for the purpose of positioning at least one item to be washed in one of the receptacles for items to be washed 12, 13, 14 on the basis of the determined load state.

Although the present invention has been described with reference to exemplary embodiments, it can be modified in numerous different ways.

The invention claimed is:

1. A system, comprising:
a dishwasher including a dishwasher cavity;
a door for closing the dishwasher cavity;
a number of receptacles for accommodating items to be washed;
a control device configured to carry out a washing program from a number of washing programs for washing items to be washed;
an optical sensor configured to record a first optical sensor signal of the dishwasher cavity and configured to record a second optical sensor signal of an additional item to be washed that is to be introduced into the dishwasher cavity;
a determining unit configured to determine a load state of the dishwasher cavity as a function of the first optical sensor signal recorded by the optical sensor; and
an output unit configured to output a first positioning recommendation to a user for positioning at least one of the items to be washed in one of the receptacles based on the load state determined by the determining unit and configured to output a second positioning recommendation to the user for sorting the additional item to be washed into one of the receptacles based on the second optical sensor signal and based on the load state.

2. The system of claim 1, wherein the dishwasher is embodied as a household dishwasher.

3. The system of claim 1, wherein the output unit outputs the first or second positioning recommendation to the user based on the load state and a target loading of the dishwasher.

4. The system of claim 1, wherein the optical sensor is configured to record an optical sensor signal of an item to be washed, said output unit configured to take into consideration a geometry, a volume and/or a shape of the item to be washed when outputting the first or second positioning recommendation to the user.

5. The system of claim 1, wherein the determining unit is configured, when determining the load state of the dishwasher cavity, to detect an incorrect positioning of a particular item to be washed that is arranged in one of the receptacles, said output unit configured to output the first positioning recommendation to the user to re-sort the particular item to be washed based on the incorrect positioning detected by the determining unit.

6. The system of claim 1, wherein the determining unit is configured, when determining the load state of the dishwasher cavity, to detect an incorrect orientation of a particular item to be washed that is arranged in one of the receptacles, said output unit configured to output the first positioning recommendation to the user to rotate the particular item to be washed based on the incorrect orientation detected by the determining unit.

7. The system of claim 6, wherein the first positioning recommendation outputted by the output unit indicates to turn over the particular item to be washed based on the incorrect orientation detected by the determining unit.

8. The system of claim 1, wherein the output unit is configured to use an augmented reality representation or a virtual reality representation to output the first or second positioning recommendation to the user.

9. The system of claim 1, wherein the optical sensor comprises a camera, with the first optical sensor signal comprising an image and/or a video of the dishwasher cavity.

10. The system of claim 1, wherein the dishwasher is designed to have integrated therein the optical sensor, the determining unit and the output unit.

11. The system of claim 1, further comprising a facility external to the dishwasher and designed to have integrated therein the optical sensor.

12. The system of claim 1, further comprising a facility external to the dishwasher and designed to have integrated therein the optical sensor, the determining unit and the output unit.

13. The system of claim 12, wherein the determining unit and the output unit are embodied as part of an app designed for installation on the external facility.

14. A method for operating a dishwasher including a number of receptacles for accommodating items to be washed, with the receptacles being insertable in a dishwasher cavity, said method comprising:
recording a first optical sensor signal of the dishwasher cavity by an optical sensor of the dishwasher;
determining a load state of the dishwasher cavity as a function of the first optical sensor signal recorded by the optical sensor;
outputting a first positioning recommendation to a user for positioning at least one item to be washed in one of the receptacles based on the load state;
detecting, by the optical sensor, a second optical sensor signal of an additional item to be washed to be introduced into the dishwasher cavity; and
outputting a second positioning recommendation to the user for sorting the additional item to be washed into one of the receptacles based on the second optical sensor signal and the load state.

15. The method of claim 14, wherein the dishwasher is a household dishwasher.

16. The method of claim 14, further comprising:
detecting an incorrect positioning of an item to be washed in one of the receptacles; and
outputting the first positioning recommendation to the user to re-sort the item to be washed based on the detected incorrect positioning.

17. The method of claim 14, further comprising:
detecting an incorrect orientation of an item to be washed in one of the receptacles; and
outputting the first positioning recommendation to the user to rotate the item to be washed based on the detected incorrect orientation.

18. A computer program product for operating a dishwasher, comprising a computer program embodied in a non-transitory computer readable medium, wherein the computer program, when loaded into a program-controlled facility and executed by the program-controlled facility, causes the program-controlled facility to carry out one or more operations, the operations comprising:

recording a first optical sensor signal of a dishwasher cavity by an optical sensor of the dishwasher, the dishwasher having one or more receptacles to accommodate items to be washed;

determining a load state of the dishwasher cavity as a function of the first optical sensor signal recorded by the optical sensor;

outputting a first positioning recommendation to a user for positioning at least one item to be washed in one of the receptacles based on the load state;

detecting, by the optical sensor, a second optical sensor signal of an additional item to be washed to be introduced into the dishwasher cavity; and     outputting a second positioning recommendation to the user for sorting the additional item to be washed into one of the receptacles based on the second optical sensor signal and the load state.

\* \* \* \* \*